UNITED STATES PATENT OFFICE.

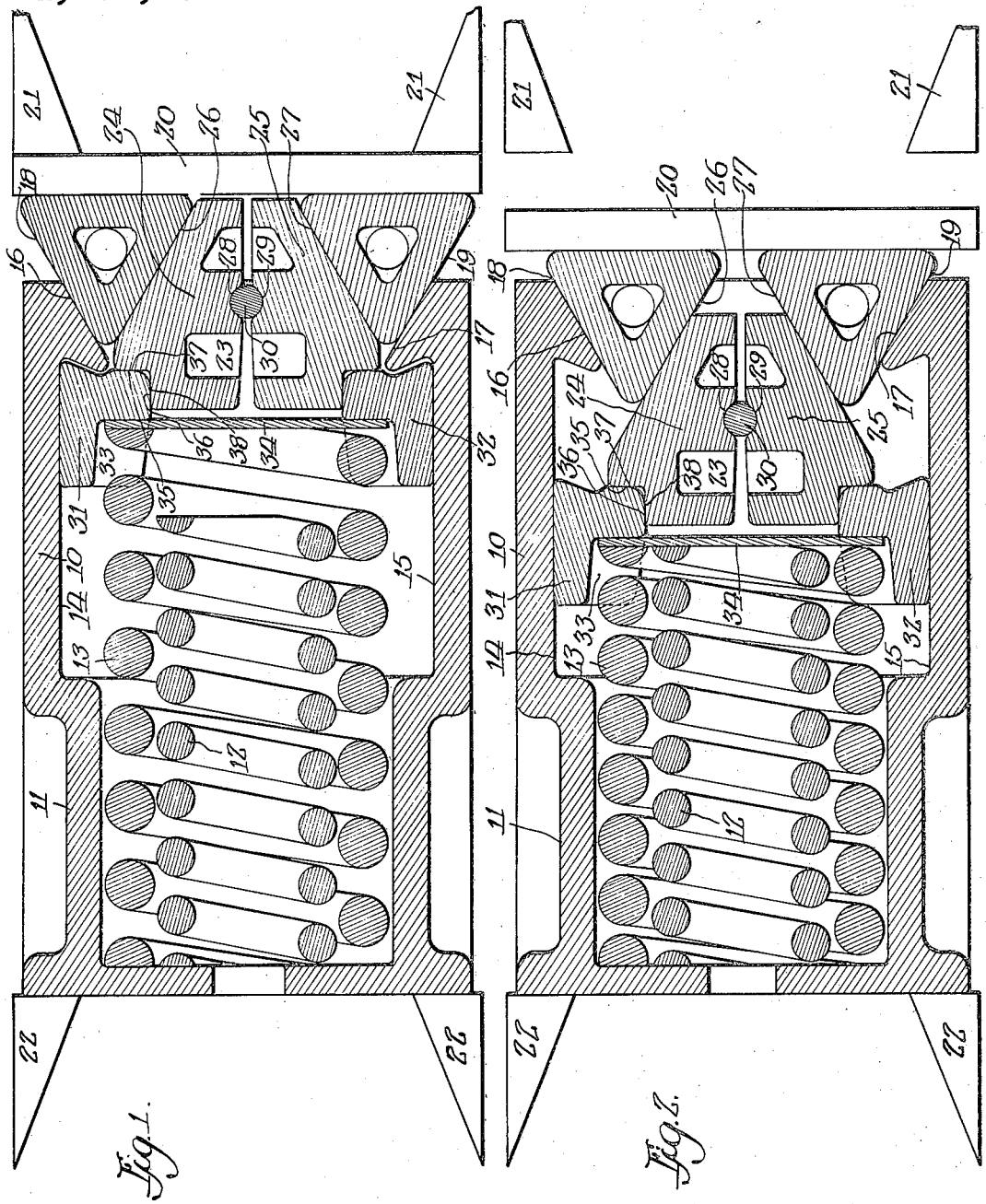

HENRY A. CHRISTY, OF KENILWORTH, ILLINOIS, ASSIGNOR, BY MESNE ASSIGNMENTS, TO SANGER BROWN, OF KENILWORTH, ILLINOIS.

DRAFT-GEAR.

1,263,374.              Specification of Letters Patent.      Patented Apr. 23, 1918.

Application filed November 19, 1917. Serial No. 202,719.

*To all whom it may concern:*

Be it known that I, HENRY A. CHRISTY, a citizen of the United States, residing at Kenilworth, in the county of Cook and State of Illinois, have invented certain new and useful Improvements in Draft-Gears, of which the following is a specification.

My invention has for its object the improvement of draft-gears for railway-cars and cushion, buffing, or shock-absorbing devices for similar appliances, one of its leading aims being the employment of suitable friction means in association with one or more yielding cushions, such as ordinary coil-springs, whereby to obtain large resistant capacity which shall come steadily into action, gradually and uniformly absorbing the shock, and which shall release without substantial rebound or recoil.

The combination and coöperation of spring or other yielding cushion means and co-acting friction elements has been found to be of much service, but their proper and best coöperative action has not previously been secured.

The present construction is designed to overcome and eliminate the weaknesses and defects in prior devices of this general character, the improvement residing principally in the construction, arrangement, and effective action of the friction portion of the appliance as distinguished from the springs, which, of course, however, directly coöperate with and supplement the action of the friction-blocks.

Another purpose of the invention is to so design, arrange, and proportion the friction elements and their operating-means that the friction surfaces will always properly bear on one another, without likelihood of detrimental displacement or excessive or improper wear.

A further feature of the invention resides in the ease with which the improved and novel appliance accommodates itself to and compensates for wear in the friction elements and the facility afforded for replacing the parts to overcome the effects of such wear when the latter, if at all, becomes excessive.

In order that those skilled in this art may fully understand this invention and appreciate its various advantages, both structural and functional, I have illustrated a preferred and desirable embodiment of the same in the accompanying drawing, which forms a part of this specification, and throughout the views of which like reference characters refer to the same parts.

In the drawing:

Figure 1 is a horizontal section through the improved draft-gear as applied to railway-cars; and Fig. 2 shows the same appliance partly compressed under action.

By reference to the drawings, it will be observed that the structure comprises a suitable housing or casing 10, which for convenience may be cast, if desired, in one piece, such housing at one end having a reduced cylindrical barrel portion 11 accommodating nested springs 12 and 13 of different lengths disposed longitudinally of the appliance, and, as is customary, bearing at one end against the head or end wall of the casing. This housing or shell also has two inner vertical plane surfaces or faces 14 and 15 and at one end such housing is provided with two oppositely-beveled or diverging or flaring surfaces 16 and 17.

Slidable on these and adapted to travel both longitudinally of the device and also crosswise thereof, are a pair of wedges 18 and 19, conveniently of equilateral triangular shape in cross-section, the outer alined or registering faces of such wedges resting against and bearing on a follower 20 of the usual construction. Such follower coöperates with the customary draft-sill stops 21, 21, and the opposite end of the housing co-acts with opposed stops 22, 22.

Between these wedges I employ an intermediate divided wedge member characterized as a whole 23, but composed of two parts 24 and 25 oppositely-beveled at one end at 26 and 27 respectively for co-action with the corresponding faces of the wedges 18 and 19. The adjacent or approximate faces of these two companion elements 24 and 25 are each substantially semi-circularly recessed at 28 and 29 to unitedly form a practically cylindrical bearing for a pivot pin 30 on which both of these members are adapted to rock. In other words, this intermediate wedge member 23 comprises two elements rockingly associated with one another. Such allied members 24 and 25 coöperate with a pair of friction or pressure blocks 31 and 32 having plane or flat outer faces bearing against and adapted to slide longitudinally on the opposed housing surfaces 14 and 15.

On their inner surfaces these blocks are recessed at 33 to provide for a spring plate 34 against which spring 13 normally bears, the inner lighter spring 12 being somewhat shorter and coming into action only after the gear has been partially compressed. Each of these pressure-blocks 31 and 32 has two faces 35 and 36 at substantially right-angles to one another, and such faces bear against similarly related faces 37 and 38 on the inner ends of the members 24 and 25, such ends being recessed or cut away to provide such surfaces.

The operation of this draft-rigging takes place practically as follows:

On both draft and buff, the wedges 18 and 19 travel inwardly longitudinally relatively to the housing which may be brought about under draft by pulling the housing forwardly by the coupler yoke or strap, or under buff by pushing the wedges rearwardly by the follower as shown in Fig. 2, the results in both cases being much the same.

Owing to the presence of the oppositely-beveled or convergent surfaces 16 and 17 with which these wedges coöperate, the latter are, at the same time, forced inwardly toward one another transversely of the appliance, frictionally sliding on the follower as illustrated in Fig. 2. This action results in squeezing or forcing the intermediate wedge-member 23 inwardly lengthwise of the device, such intermediate member in the present instance, due to the particular angles of the blocks employed, traveling in this direction twice as rapidly and twice as far as the wedges 18 and 19. Such lengthwise inward travel of the blocks 24 and 25 positively pushes the pressure blocks 31 and 32 inwardly of the housing in opposition to the expanding action of the one or more springs. It will be appreciated also that since rock or pivot pin 30 is substantially midway of the length of the members 24 and 25, the squeezing action of the wedges 18 and 19, during their approach to one another on such blocks at one side of the pivot, tends to separate the opposite ends of these members, and this action tends, by reason of the coöperation of the surfaces 36 and 38, to spread the pressure or friction blocks 31 and 32 into frictional engagement with the opposed inner faces of the housing.

It will be understood, therefore, that these two pressure-blocks are pushed inwardly of the housing lengthwise thereof positively by the inward travel of the intermediate member 23, and, at the same time, they are forced outwardly transversely of the device to secure adequate frictional engagement with the surfaces of the housing by the attempted rocking action of the elements 24 and 25 on their common pivot, occasioned by the transverse travel of the wedges 18 and 19.

The employment of these two separate bearings between the members 24 and 25 and the pair of pressure-blocks is important, because it sub-divides the two different functions of the members 24 and 25 and permits the two pressures exerted upon the friction blocks to be imposed thereon in directions resulting in the best advantage, and there is no tendency to dislodge or disarrange or tilt these blocks out of proper coöperative relation with the housing surfaces on which they bear.

In case the associated friction elements wear so that it becomes desirable or necessary to compensate therefor or adjust the parts to overcome it, this may be readily and easily accomplished by inserting a pivot pin of slightly larger diameter and by this simple change all parts assume their proper relations and the effects of wear are entirely eliminated.

The invention is not restricted and limited to the precise and exact features of construction shown and described, but many minor mechanical changes may be incorporated in the structure without departure from the substance and essence of the invention and without the sacrifice of any of its substantial benefits and advantages.

I claim:

1. In a draft-gear of the character described, the combination of a housing equipped near one end with oppositely-beveled or flared surfaces, an intermediate wedge-member comprising two elements rockingly associated with one another between their ends, a pair of wedges interposed between said flared housing surfaces and the corresponding wedge faces of said wedge-member, a follower co-acting with said pair of wedges, a pair of pressure-blocks bearing against and adapted to slide on opposed inner surfaces of said housing, and a yielding cushion in said housing opposing the inward travel of said pressure-blocks, each of said intermediate wedge elements having a bearing on the corresponding pressure-block in the direction of its travel longitudinally of said housing, and another bearing transversely of said housing, whereby under action said wedges frictionally slide inwardly of said housing on the surfaces of said housing and intermediate member and also slide transversely of the appliance on said follower, the inward travel of said intermediate wedge-member positively forcing said pressure-blocks in the same direction, the tendency of the inner end portions of said rockable intermediate wedge elements to spread due to the transverse inward travel of said wedges forcing the pressure-blocks positively against the housing faces, substantially as described.

2. In a draft-gear of the character described, the combination of a housing equipped near one end with oppositely-beveled or flared surfaces, an intermediate member comprising two elements rockingly associated with one another between their ends, a pair of wedges interposed between said flared housing surfaces and the adjacent faces of said intermediate member, a follower co-acting with said pair of wedges, a pair of pressure-blocks bearing against and adapted to slide on opposed inner surfaces of said housing, and a yielding cushion in said housing opposing the inward travel of said pressure-blocks, each of said intermediate member elements having a plurality of bearings on the corresponding pressure-block at an angle to one another, substantially as described.

3. In a draft-gear of the character described, the combination of a housing equipped near one end with oppositely-beveled or flared surfaces, an intermediate wedge-member comprising two elements rockingly associated with one another between their ends, a pair of wedges interposed between said flared housing surfaces and the corresponding wedge-faces of said wedge-member, a follower co-acting with said pair of wedges, a pair of pressure-blocks bearing against and adapted to slide on opposed inner surfaces of said housing, and a yielding cushion in said housing opposing the inward travel of said pressure-blocks, each of said intermediate wedge-member elements having a plurality of bearings on the corresponding pressure-block at an angle to one another, substantially as described.

4. In a draft-gear of the character described, the combination of a housing having a beveled surface near one end, a yielding cushion accommodated in said housing, a pressure-block adapted to slide longitudinally in said housing and bearing against said housing, said sliding movement being opposed by the action of said cushion, a wedge co-acting with said beveled surface, and a slidable rockable member coöperating with said wedge and having a bearing on said pressure-block in the direction of the travel of the block, and a bearing thereon toward said housing, whereby the inward travel of said rockable member positively forces the pressure-block in the same direction through said first bearing and the tendency of said rockable member to turn on its pivot positively forcing the block laterally into frictional engagement with said housing, substantially as described.

5. In a draft-gear of the character described, the combination of a housing having a beveled surface near one end, a yielding cushion accommodated in said housing, a pressure-block adapted to slide longitudinally in said housing and bearing against said housing, said sliding movement being opposed by the action of said cushion, a wedge co-acting with said beveled surface, a slidable rockable wedge-member coöperating with said wedge and having bearings on said pressure-block at an angle to one another, whereby the inward travel of said rockable wedge-member positively forces the pressure-block in the same direction and the tendency of said rockable wedge member to turn on its pivot positively forcing the block laterally into frictional engagement with the housing, substantially as described.

HENRY A. CHRISTY.